(12) United States Patent
Christen et al.

(10) Patent No.: US 10,126,739 B2
(45) Date of Patent: Nov. 13, 2018

(54) REMOTE CONTROL DEVICE FOR THE REMOTE CONTROL OF A MOTOR VEHICLE

(71) Applicant: FORD GLOBAL TECHNOLOGIES, LLC, Dearborn, MI (US)

(72) Inventors: Urs Christen, Aachen (DE); Timothy C. Bettger, Aachen (DE); Thomas Rambow, Aachen (DE); Uwe Gussen, Huertgenwald (DE); Georg Neugebauer, Herzogenrath (DE); Julian David Pott, Aachen (DE); Nadja Wysietzki, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 15/467,250

(22) Filed: Mar. 23, 2017

(65) Prior Publication Data
US 2017/0285629 A1    Oct. 5, 2017

(30) Foreign Application Priority Data
Mar. 31, 2016    (DE) .................. 10 2016 205 285

(51) Int. Cl.
| | |
|---|---|
| *G05D 1/00* | (2006.01) |
| *B62D 15/02* | (2006.01) |
| *G01S 19/42* | (2010.01) |
| *G06F 3/0484* | (2013.01) |
| *G06F 3/0488* | (2013.01) |

(52) U.S. Cl.
CPC ........ *G05D 1/0016* (2013.01); *B62D 15/0285* (2013.01); *G01S 19/42* (2013.01); *G05D 1/0022* (2013.01); *G06F 3/04845* (2013.01); *G06F 3/04886* (2013.01)

(58) Field of Classification Search
CPC ............... G05D 1/0016; G05D 1/0022; G06F 3/04886; G06F 3/04845; B62D 15/0285; G01S 19/42
See application file for complete search history.

(56) References Cited

U.S. PATENT DOCUMENTS

2004/0249564 A1    12/2004   Iwakiri et al.
2014/0222252 A1*    8/2014   Matters ............... B62D 15/027
                                                701/2

FOREIGN PATENT DOCUMENTS

| CN | 102874251 A | 1/2013 |
|----|-------------|--------|
| DE | 10346888 A1 | 5/2005 |

\* cited by examiner

*Primary Examiner* — Yuen H Wong
(74) *Attorney, Agent, or Firm* — Frank MacKenzie; Brooks Kushman P.C.

(57) ABSTRACT

The disclosure concerns a control device for the remote control of a motor vehicle including a display device for visualizing the surroundings of the motor vehicle detected by motor vehicle sensors of the motor vehicle, and a motor vehicle symbol in a surrounding area of the motor vehicle. An input device inputs a desired parking position within the detected surrounding area of the motor vehicle by displacement of the motor vehicle symbol that is represented on the display device.

17 Claims, 4 Drawing Sheets

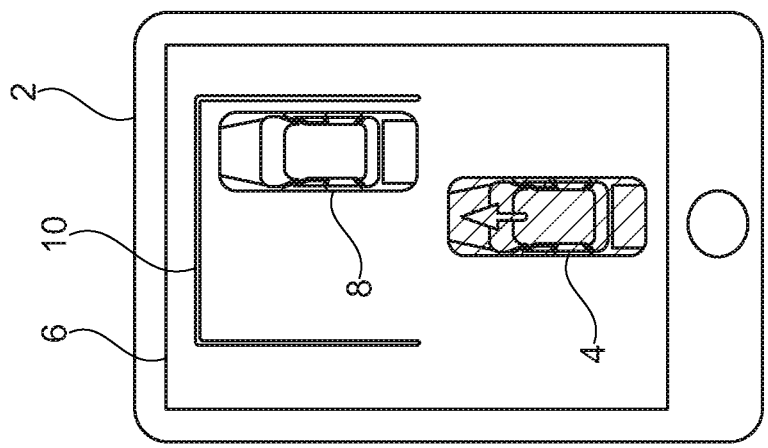
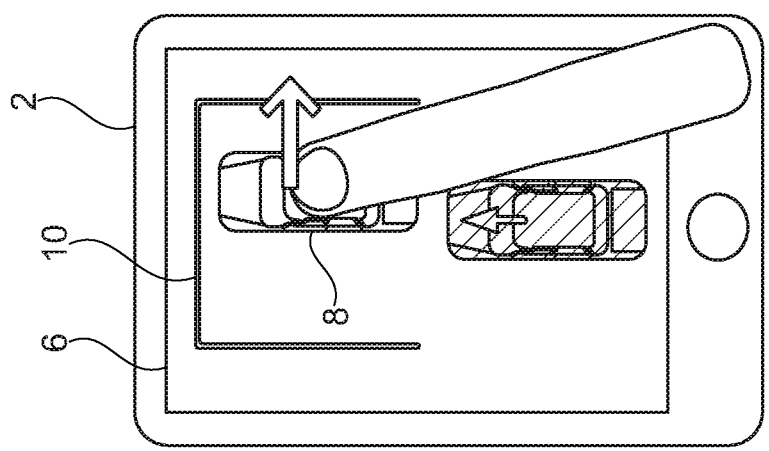
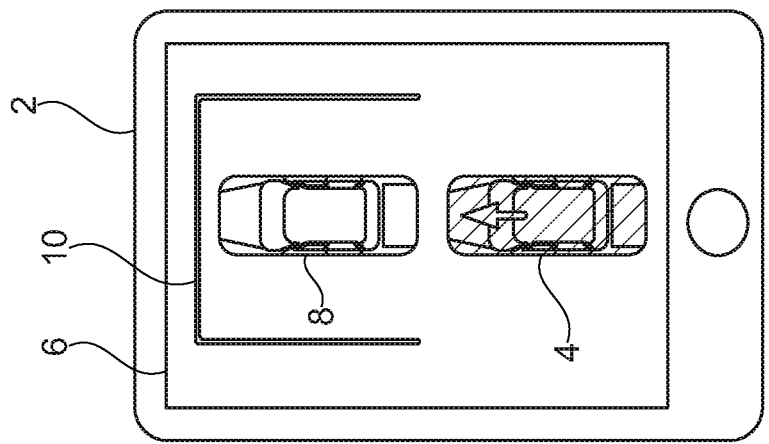

ated Mar. 31, 2016, which is hereby incorporated by reference in its entirety.

REMOTE CONTROL DEVICE FOR THE REMOTE CONTROL OF A MOTOR VEHICLE

CROSS-REFERENCE TO RELATED APPLICATIONS

This application claims foreign priority benefits under 35 U.S.C. § 119(a)-(d) to DE Application 10 2016 205 285.3 filed Mar. 31, 2016, which is hereby incorporated by reference in its entirety.

TECHNICAL FIELD

The disclosure concerns a control device for the remote control of a motor vehicle.

BACKGROUND

Parking assistants or remote parking aids—RePAs—park a motor vehicle autonomously, i.e. automatically without intervention by the driver of the vehicle, both in longitudinal parking spaces and also in transverse parking spaces, and they also unpark from parking spaces. For this purpose, the parking assistant determines the correct steering angle after it has measured the parking space by means of suitable sensors.

From CN 102874251A, a control device for the remote control of a motor vehicle is known, with which the motor vehicle to be parked can be parked by a driver of the motor vehicle that is no longer in the motor vehicle. For this purpose, the driver of the motor vehicle can initiate the parking process using the control device in the form of a smartphone. In order to be able to use the available parking space optimally, a boundary line that must not be crossed by the parked motor vehicle can be predetermined by means of a touch display of the control device. Thereupon, the control device determines corresponding control signals for controlling the motor vehicle in order to park it accordingly. However, improved utilization of the available parking space can only be achieved to a very limited extent in this way.

There is therefore a need to demonstrate ways in which the available parking space can be utilized better.

SUMMARY

The object of the disclosure is achieved by a control device for the remote control of a motor vehicle with a display device for visualizing the surroundings of the motor vehicle detected by motor vehicle sensors of the motor vehicle and a motor vehicle symbol in the surroundings of the motor vehicle, and an input device for inputting a desired parking position within the detected surroundings of the motor vehicle by moving the motor vehicle symbol that is displayed by the display device.

This enables the desired and optimal parking position to be directly predetermined within the detected surroundings of the motor vehicle by a driver of the motor vehicle. In particular, the desired parking position can thus be optimized in respect of a plurality of parameters and no longer only in relation to a boundary line.

According to one embodiment, the control device comprises a touch display as a display device and an input device. This enables a driver of the motor vehicle to carry out a particularly simple displacement of the represented motor vehicle symbol by touching and shifting said symbol.

Alternatively, the motor vehicle symbol that is displayed by the display device can also be displaced with another input device for a graphical user interface, such as for example a computer mouse.

According to a further embodiment, the control device is designed to read in GPS (Global Positioning System) data of the motor vehicle and to associate said data with a stored desired parking position. Thus, on reaching a position near a regularly used parking area, the stored parking position can be called up and activated after selecting said parking position without further input on the part of the driver of the vehicle. This simplifies the use of the control device.

According to a further embodiment, a lateral and/or longitudinal parking position can be predetermined by displacement of the motor vehicle symbol that is displayed by the display device. Thus, not only can a distance of, for example, a wall in the forward or reverse direction be determined, but also a lateral distance to, for example, a wall or other parked motor vehicles can be predetermined.

According to a further embodiment, an angular position can be predetermined by displacement of the motor vehicle symbol that is displayed by the display device. Thus, an angle can be predetermined, for example, in relation to a wall, for example if parking spaces are disposed at an angle to a wall, i.e. at an angle between zero and 90°.

According to a further embodiment, the control device is designed to read in an orientation of parked motor vehicles detected by motor vehicle sensors and to display said orientation in the form of motor vehicle symbols in the surroundings of the motor vehicle. For this, orientation refers to the direction of the parked motor vehicles in which the forward and reverse direction thereof lies. Using said orientation, it can be determined on which side of the parked motor vehicles the driver's door is located. Accordingly, this can be taken into account during subsequent parking of the motor vehicle, in order to ensure, thereby, that sufficient space remains to be able to open the driver's door.

According to a further embodiment, the control device is designed so that it enables a driver of the motor vehicle to overwrite the displayed orientation. This can be the case if, for example, there is a right-hand drive instead of a left-hand drive vehicle in the parked motor vehicles. Thus, it is also ensured in this case that sufficient space remains to be able to open the driver's door.

According to a further embodiment, the control device is designed to cause half a wheel revolution of wheels of the motor vehicle by a forward and/or reverse movement of the motor vehicle. The fitting of snow chains is considerably simplified by this, because the driver of the motor vehicle does not have to enter the motor vehicle in order to move the motor vehicle suitably. Moreover, it is ensured in this way that the wheels are actually only turned by half a wheel revolution, which it is difficult for a driver of the motor vehicle who is inside the motor vehicle to achieve.

The disclosure also includes a system comprising a motor vehicle and such a control device, as well as a computer program product comprising software components for operating such a control device.

The disclosure will now be described using a drawing. In the figures:

BRIEF DESCRIPTION OF THE DRAWINGS

FIG. 2A shows a first step during the parking of a motor vehicle, FIG. 2B shows a second step during the parking of a motor vehicle, FIG. 2C shows a third step during the parking of a motor vehicle.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
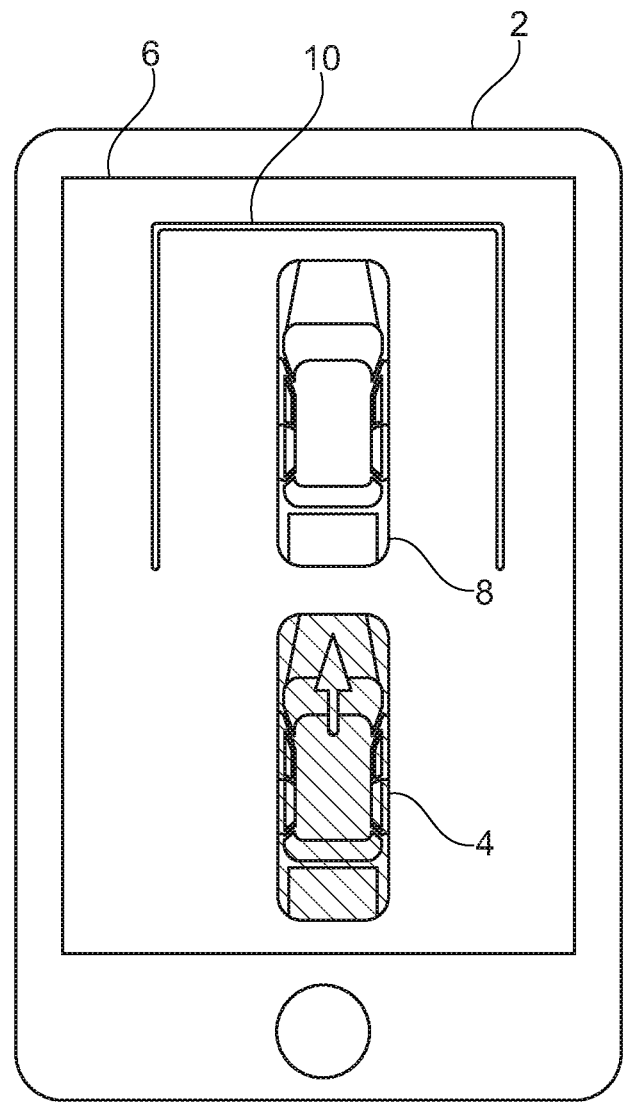
FIG. 1 shows an exemplary embodiment of a control device for the remote control of a motor vehicle.

Reference is made to FIG. 1 first.

A control device 2 for the remote control of a motor vehicle, for example of an automobile, is represented.

The control device 2 is a smartphone with a touch display 6 in the present exemplary embodiment. The touch display 6 is used as a display device for visualizing the surroundings of the motor vehicle detected by motor vehicle sensors of the motor vehicle, and the motor vehicle symbol 4 in the represented surroundings of the motor vehicle. For this purpose, in the present exemplary embodiment the control device 2 communicates wirelessly, for example by means of a BLUETOOTH connection, with a parking assistant of the motor vehicle for the automatic parking of the motor vehicle, the motor vehicle sensors that detect the surroundings of the motor vehicle and transfer the same to the control device 2 in the form of a corresponding data record.

Furthermore, the touch display 6 is used as an input device for inputting a desired parking position 8 within the detected surroundings of the motor vehicle by displacement of the motor vehicle symbol 4 displayed by the display device. A driver of the motor vehicle can thereby move the motor vehicle symbol 4 displayed by the touch display 6 and as a result indirectly move the motor vehicle in a known way by clicking and holding at the desired position.

Furthermore, the control device 2 comprises an analyzer (not shown) that analyzes the detected surroundings of the motor vehicle and the parking position 8 input by the driver of the motor vehicle in order to determine corresponding control signals for controlling the motor vehicle in order to thereby achieve the desired parking position 8.

If, on the other hand, the driver of the motor vehicle moves the displayed motor vehicle symbol 4 into an area that cannot be used as a parking area, for example since the distance from the wall 10 falls below a predetermined minimum distance from the wall 10, the control unit 2 blocks said movement and/or outputs an audible and/or visual alarm signal.

Furthermore, the control device 2 is designed to read in GPS data of the motor vehicle and to associate said data with a stored desired parking position 8. By a comparison of the current GPS data with stored GPS data, the control device 2 detects that the motor vehicle is near the parking position 8, i.e. the distance of the motor vehicle from the parking position 8 is less than a predetermined distance. If the comparison of the GPS data reveals that the motor vehicle is near the parking position 8, which is for example a regularly used parking space, the control device 2 provides the stored parking position 8 on the touch display 6 for selection by the driver of the motor vehicle.

The control device 2 with the touch display 6 and the analyzer comprise hardware and/or software components for this purpose.

In FIG. 1, the touch display 6 is displaying the motor vehicle symbol 4 in the detected surroundings of the motor vehicle, which in the present exemplary embodiment are bounded by a symbolically represented u-shaped wall 10. The automatically preset parking position 8 can be changed by the driver of the motor vehicle by displacement of the motor vehicle symbol 4, for example in the direction of the arrow if this is desired.

Reference is now made to FIGS. 2A through 2C.

In FIG. 2A, at the start of a parking process a central parking position 8 within the u-shaped wall 10 that is predetermined by the control device 2 is shown.

FIG. 2B shows that by clicking or touching the motor vehicle symbol 4 represented on the touch display 6, a driver of the motor vehicle is displacing said symbol laterally or sideways to the right in relation to the forward direction of travel of the motor vehicle 4 that is indicated by the arrow.

FIG. 2C shows the displayed motor vehicle symbol 4 in the final parking position 8 thereof with a minimum distance from the wall 10 on the passenger's side of the motor vehicle symbol 4, whereas on the driver's side there is sufficient room to be able to open the driver's door of the motor vehicle. Thus, the available parking space is used optimally.

Figure 3:
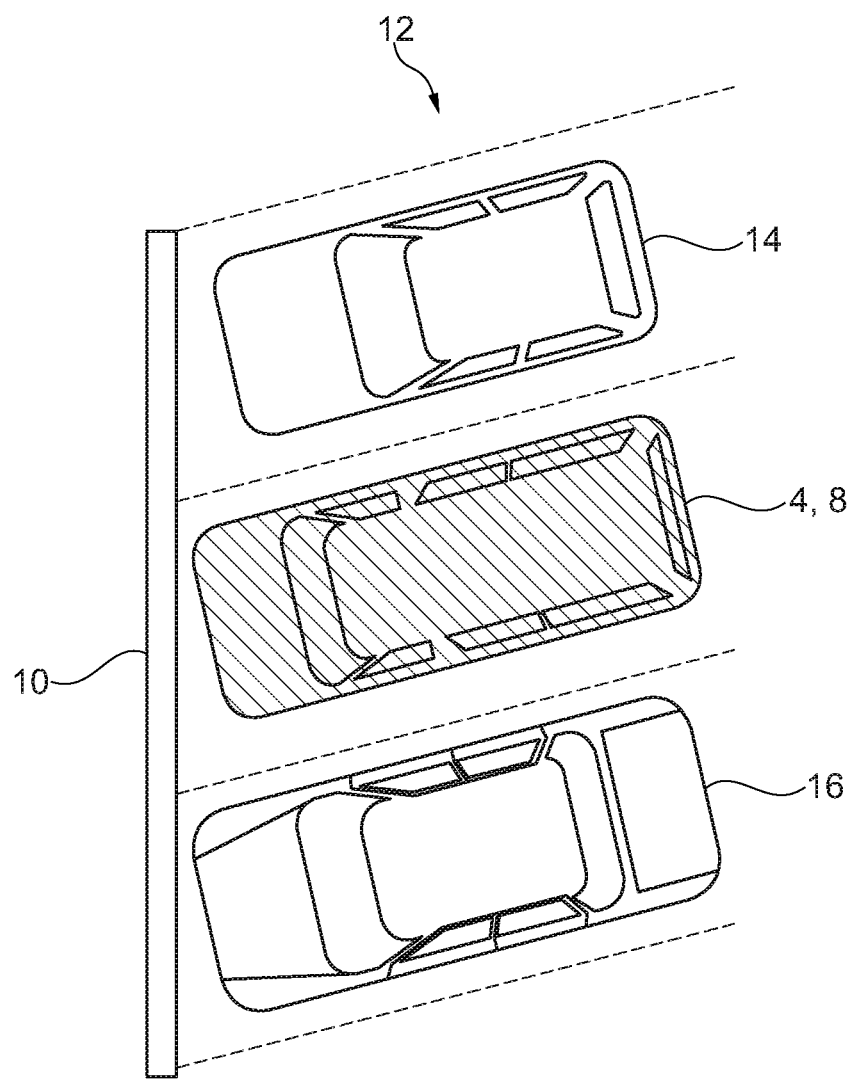
FIG. 3 shows parking in an angled parking space.

Reference is additionally made to FIG. 3.

FIG. 3 shows three angled parking spaces 12 with an orientation represented by the lateral boundary lines shown and that extends at an angle to a longitudinal direction of the wall 10. In the present exemplary embodiment, the angled parking spaces 12 are at an angle of 70° to the longitudinal direction of the wall 10.

In the present exemplary embodiment, the control device 2 is designed to predetermine an angular position by rotating the motor vehicle symbol 4 represented on the touch display. Thus, an angular orientation can be predetermined in order to adjust the parking position 8 to the lateral boundary lines. Thus, the motor vehicle, represented by the motor vehicle symbol 4, can be parked in the parking position 8 between the adjacent motor vehicles, represented by the motor vehicle symbols 14, 16, without crossing the lateral boundary lines.

Figure 4:
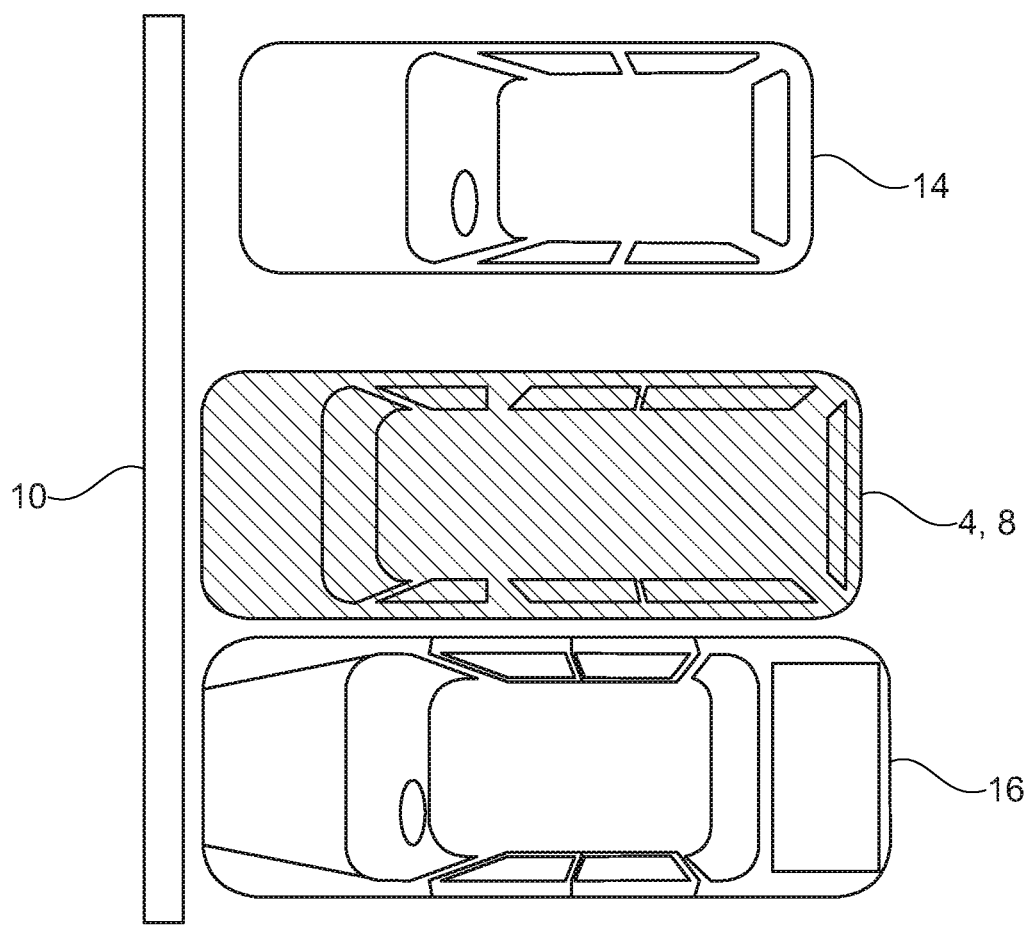
FIG. 4 shows parking between adjacent parked motor vehicles.

Reference is additionally made to FIG. 4.

FIG. 4 shows a scenario in which the parked motor vehicle, represented by the motor vehicle symbol 4, is parked at the parking position 8 between the adjacent motor vehicles represented by the motor vehicle symbols 14, 16.

Here motor vehicle sensors of the motor vehicle have detected that both the first adjacent motor vehicle, represented by the motor vehicle symbol 14, and also the second motor vehicle, represented by the motor vehicle symbol 16, are parked in the forward direction of travel. Accordingly, when determining the parking position 8 by the control device 2, the parking position 8 is determined so that a minimum distance from the driver's side of the first adjacent motor vehicle is guaranteed in order to enable the driver's door of the first adjacent motor vehicle to open, whereas the distance from the passenger's side of the second adjacent motor vehicle is significantly less and in the present exemplary embodiment corresponds to the distance from the wall 10 in FIG. 2C. Thus, the available parking space is used optimally.

Furthermore, the control device 2 according to the present exemplary embodiment also has the possibility of overwriting the detected orientation by a driver of the motor vehicle in the present exemplary embodiment. This can be the case if one of the two adjacent motor vehicles 14, 16 is not a left-hand drive as represented in FIG. 4, but a right-hand drive. In this case (or in the case of incorrectly detected motor vehicle orientation), the parking position 8 would be closer to the first adjacent motor vehicle 14 and further from the second adjacent motor vehicle 16.

Furthermore, in the present exemplary embodiment the control device 2 is designed to cause half a wheel revolution of wheels of the motor vehicle 4 by a forward and/or reverse movement of the motor vehicle 4 in order to simplify the fitting of snow chains.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A control device for remote control of a vehicle comprising:
    a display device for visualizing an area surrounding the vehicle as detected by vehicle sensors and a vehicle symbol indicating a position of the vehicle within the area;
    an input device for inputting a desired parking position within the area, wherein the vehicle symbol represented by the display is displaced into the desired parking position,
    wherein the control device is configured to, in response to displacing the vehicle symbol into the desired parking position, control, via a park assist system, the vehicle to achieve the desired parking position by causing half a wheel revolution of vehicle wheels by a forward or reverse movement of the vehicle.

2. The control device as claimed in claim 1, wherein the control device comprises a touch display which functions as the display device and the input device.

3. The control device as claimed in claim 1, wherein the control device is configured to read in global positioning system (GPS) data and to associate the GPS data with the desired parking position.

4. The control device as claimed in claim 1, wherein the control device is configured to predetermine a lateral and/or longitudinal parking position responsive to input to the input device of the displacement of the vehicle symbol as represented by the display device.

5. The control device as claimed in claim 1, wherein the control device is configured to predetermine an angular position responsive to input to the input device of the displacement of the vehicle symbol as represented by the display device.

6. The control device as claimed in claim 1, wherein the control device is configured to receive an orientation of adjacent, parked vehicles detected by the vehicle sensors and to display the orientation as adjacent vehicle symbols in the area surrounding the vehicle.

7. The control device as claimed in claim 6, wherein the control device is configured to receive input via the input device to overwrite the orientation.

8. A vehicle parking assist system comprising:
    a display for visualizing a vehicle surrounding area that is detected by vehicle sensors, and a vehicle symbol in the vehicle surrounding area;
    an input device for inputting a desired parking position within the vehicle surrounding area detected by the vehicle sensors, wherein the vehicle symbol represented by the display is displaced into the desired parking position; and
    a control device configured to, in response to displacing the vehicle symbol into the desired parking position, control the vehicle to achieve the desired parking position by causing half a wheel revolution of vehicle wheels by a forward or reverse movement.

9. The vehicle parking assist system as claimed in claim 8, wherein the display and input device are comprised as a touch display communicable with the control device.

10. The vehicle parking assist system as claimed in claim 8, wherein the control device is designed to read in GPS data, from the vehicle sensors, of the vehicle symbol and to associate the GPS data with the desired parking position on the display.

11. The vehicle parking assist system as claimed in claim 8, wherein the control device is configured to receive input of an orientation of adjacent, parked vehicles detected by the vehicle sensors and to send the orientation onto the display, the orientation being adjacent vehicle symbols in the vehicle surrounding area.

12. The vehicle parking assist system as claimed in claim 11, wherein the control device is configured such that a driver is able to overwrite the orientation on the display.

13. A parking assist method comprising:
    displaying, via a display, a visualization of an area surrounding a vehicle as detected by vehicle sensors, including a vehicle symbol indicating a position of the vehicle within the area; and
    controlling the vehicle, via a control device, to achieve a desired parking position responsive to receiving input of the desired parking position within the area surrounding the vehicle as a displacement of the vehicle symbol into the desired parking position; and
    causing half a wheel revolution of vehicle wheels, via a park assist system, by a forward or reverse movement of the vehicle to achieve the desired parking position.

14. The method as claimed in claim 13, wherein the area includes a predetermined displacement of the vehicle symbol into lateral and longitudinal parking positions.

15. The method as claimed in claim 13, wherein the area includes a predetermined displacement of the vehicle symbol into an angular position.

16. The method as claimed in claim 13, wherein the display further visualizes an orientation of adjacent, parked vehicles, detected by the vehicle sensors, as adjacent vehicle symbols in the area.

17. The method as claimed in claim 16, wherein a driver is able to overwrite the orientation in the display.

* * * * *